US009673905B1

(12) United States Patent
Zhang et al.

(10) Patent No.: US 9,673,905 B1
(45) Date of Patent: Jun. 6, 2017

(54) METHOD AND DEVICE FOR DEMARCATING DATA BURSTS

(71) Applicant: Marvell International Ltd., Hamilton (BM)

(72) Inventors: Jin Zhang, Pleasanton, CA (US); Kok-Wui Cheong, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 70 days.

(21) Appl. No.: 14/661,948

(22) Filed: Mar. 18, 2015

Related U.S. Application Data (60) Provisional application No. 61/955,083, filed on Mar. 18, 2014.

(51) Int. Cl.
*H04B 10/27* (2013.01)
*H04L 27/26* (2006.01)
*H04L 25/02* (2006.01)
*H04J 14/00* (2006.01)

(52) U.S. Cl.
CPC .................................. *H04B 10/27* (2013.01)

(58) Field of Classification Search
CPC ............................... H04B 10/27; H04B 7/046
USPC ........................................ 398/66, 43, 79, 76
See application file for complete search history.

(56) References Cited

U.S. PATENT DOCUMENTS

| | | | | |
|---|---|---|---|---|
| 9,025,954 B2* | 5/2015 | Fang | .................... | H04L 12/2801 370/210 |
| 2006/0198455 A1* | 9/2006 | Fujii | ..................... | H04L 1/0006 375/260 |
| 2010/0080114 A1* | 4/2010 | Ratnam | .................. | H04L 5/0007 370/210 |
| 2011/0243268 A1* | 10/2011 | Mashino | .............. | H04J 11/0066 375/285 |
| 2014/0079399 A1* | 3/2014 | Goswami | ........... | H04Q 11/0067 398/76 |
| 2014/0178076 A1* | 6/2014 | Fang | .................... | H04J 14/0238 398/98 |
| 2014/0198865 A1* | 7/2014 | Pietsch | .................. | H04L 5/0048 375/260 |
| 2014/0255029 A1* | 9/2014 | Varanese | ............. | H04L 27/2626 398/66 |

(Continued)

OTHER PUBLICATIONS

"Hadamard matrices, Sequences, and Block Designs",Seberry, 1992.*

(Continued)

*Primary Examiner* — Oommen Jacob (57) ABSTRACT

According to various embodiments, a method for demarcating data bursts includes receiving, via a coax network, a first data burst and a second data burst at a network interface device, wherein the first data burst and the second data burst at least partially overlap in the time domain. In various embodiments, the first data burst includes a start marker, first data elements following the start marker, and an end marker following the first data elements. In various embodiments, the start marker is orthogonal to the end marker. The method further includes distinguishing, at the network interface device, the first data burst from the second data burst based on the start marker and the end marker; and transmitting the first data burst and the second data burst via an optical network such that the first data burst and the second data burst do not overlap in time.

21 Claims, 10 Drawing Sheets

(56) References Cited

U.S. PATENT DOCUMENTS

| 2014/0314418 | A1* | 10/2014 | Sun | H04B 10/27 |
| | | | | 398/89 |
| 2014/0321258 | A1* | 10/2014 | Varanese | H04L 5/0048 |
| | | | | 370/203 |
| 2014/0328589 | A1* | 11/2014 | Rahman | H04L 27/2613 |
| | | | | 398/38 |
| 2015/0256367 | A1* | 9/2015 | Prodan | H04L 25/40 |
| | | | | 398/79 |

OTHER PUBLICATIONS

"DSP-Based Evolution From Conventional TDM-PON to TDM-OFDM-PON" Yang, Journal of Lightwave technology 2013.*

"Enhanced Transmission Using TDM-OFDM in Passive Optical Networks" Dharsini, IJMTES vol. 1 Issue 5, 2014.*

Chang et al., "Overview of 10Gb/s EPON Status, Requirements and Applications," version 2.4, Ethernet Alliance, (May 2009), available at <http://www.ethernetalliance.org/wp-content/uploads/2011/10/10GEPON_WP_EA_from-FC_Final_updated_V2d44.pdf>.

* cited by examiner

| | | | | | | | | | | | | | | | |
|---|---|---|---|---|---|---|---|---|---|---|---|---|---|---|---|
| D | D | D | D | D | D | D | D | D | D | D | D | D | D | D | |
| D | D | D | D | D | D | D | D | D | D | D | D | D | D | D | 802 |
| -1 | D | 1 | D | 1 | D | -1 | D | D | 1 | D | -1 | D | -1 | D | 1 | |
| 0 | 0 | 0 | 0 | 0 | 0 | 0 | 0 | 0 | 0 | 0 | 0 | 0 | 0 | 0 | |
| 0 | 0 | 0 | 0 | 0 | 0 | 0 | 0 | 0 | 0 | 0 | 0 | 0 | 0 | 0 | |
| 1 | D | -1 | D | -1 | D | 1 | D | D | -1 | D | 1 | D | 1 | D | -1 | |
| D | D | D | D | D | D | D | D | D | D | D | D | D | D | D | 804 |
| D | D | D | D | D | D | D | D | D | D | D | D | D | D | D | |

METHOD AND DEVICE FOR DEMARCATING DATA BURSTS

CROSS-REFERENCES TO RELATED APPLICATIONS

The present disclosure claims the benefit of U.S. Provisional Patent Application No. 61/955,083, filed Mar. 18, 2014, entitled "A Method of Demarcation of Two-Dimensional Burst for Ethernet Passive Optical Network over Coax (EPoC)," the disclosure of which is hereby expressly incorporated herein by reference in its entirety.

FIELD OF THE DISCLOSURE

The present disclosure relates generally to hybrid fiber coaxial networking, and more particularly to methods and devices for demarcating data bursts.

BACKGROUND

Modern cable service providers often employ a combination of optical fiber wiring, which extends through most of the network, and coaxial ("coax") cable wiring, which extends from a central location near customers out to dwellings of the customers. The coax portion of such a network is often referred to as the "last mile." Although extending fiber wiring all the way out to customer dwellings would be the best architecture in terms of data throughput (optical fiber provides a much higher throughput than coaxial cable), doing so is often considered cost prohibitive. One of challenges in the past few years for cable service providers has been pushing data speeds and bandwidth on the coax part of the network to be as close as possible to those on the on the fiber portion of the network.

Passive Optical Network (PON) technology is considered to be a promising solution for the "last mile" problem for home broadband access. In September 2009, the Institute of Electrical and Electronics Engineers (IEEE) approved the 10 gigabits per second (Gb/s) Ethernet PON (EPON) standard, which can deliver 10 Gb/s data in the downstream direction and 10 Gb/s or 1 Gb/s in the upstream direction. Since then, the deployment of the EPON devices has been gradually expanding, mainly in the area of new home/residence/commercial construction. However, in many of the areas where both residential and commercial buildings are established and equipped with coaxial networks, the cost of installation often prevents customers from upgrading to EPON technology. To address this challenge, various industry participants have developed the concept of an EPON Protocol over Coax (EPoC).

SUMMARY

According to various embodiments, a method for demarcating data bursts includes receiving, via a coax network, a first data burst and a second data burst at a network interface device, wherein the first data burst and the second data burst at least partially overlap in the time domain. In various embodiments, the first data burst includes a start marker, first data elements following the start marker, and an end marker following the first data elements. In various embodiments, the start marker is orthogonal to the end marker. The method further includes distinguishing, at the network interface device, the first data burst from the second data burst based on the start marker and the end marker; and transmitting the first data burst and the second data burst via an optical network such that the first data burst and the second data burst do not overlap in time.

According to various embodiments, a network interface device includes a cable line terminal portion configured to receive a first data burst and a second data burst via a coax network; and an optical network unit portion. In various embodiments, the cable line terminal portion includes one or more integrated circuit devices configured to receive, via a coax network, a first data burst and a second data burst, wherein the first data burst and the second data burst at least partially overlap in the time domain, the first data burst comprises a start marker, data elements following the start marker, and an end marker following the data elements, and the start marker is orthogonal to the end marker. In various embodiments, the one or more integrated circuit devices are further configured to distinguish the first data burst from the second data burst based on the start marker and the end marker; and the optical network unit portion includes one or more integrated circuit devices configured to transmit the first data burst and the second data burst via an optical network such that the first data burst and the second data burst do not overlap in time.

According to various embodiments, a method for demarcating data bursts includes receiving, via a coax network, a first data burst and a second data burst at a network interface device. In various embodiments, the first data burst and the second data burst at least partially overlap in the time domain; the first data burst includes a start marker, first data elements following the start marker, and an end marker following the first data elements; and the start marker is orthogonal to the end marker. According to various embodiments, the method further includes calculating a sum of power of a plurality of blocks of the first data burst, comparing the calculated sum with a first threshold, detecting whether the plurality of blocks include a zero subcarrier bloc based on the comparison of the calculated sum, cross correlating at least a portion of the first data burst with at least another portion of the first data burst, comparing the cross correlation with a second threshold, and detecting whether a portion of the first data burst constitutes a start marker or an end marker based on the comparison of the cross correlation.

DETAILED DESCRIPTION

The disclosure is generally directed to example methods and devices for demarcating data bursts. According to various embodiments, a network interface device that resides at a border between an optical network (such as an EPON) and a coax network receives various data bursts from the coax network from different devices in a manner that is both time multiplexed and frequency multiplexed. The network interface device distinguishes between the different data bursts by detecting a start markers and an end marker for each burst, according to various embodiments. The start marker for a given data burst is orthogonal to an end marker for the data burst, according to various embodiments. This orthogonality facilitates the network interface device to make the distinction between data bursts, according to various embodiments. Furthermore, there may be zero (e.g., empty) subcarriers between the end of one data burst and the beginning of the next data burst, according to various embodiments. The device may then re-transmit the data bursts over the optical network in a manner that is time multiplexed, according to various embodiments. Thus, according to various embodiments, the device, in effect, maps two-dimensional bursts from the coax network onto one-dimensional bursts of the optical network.

Figure 1:
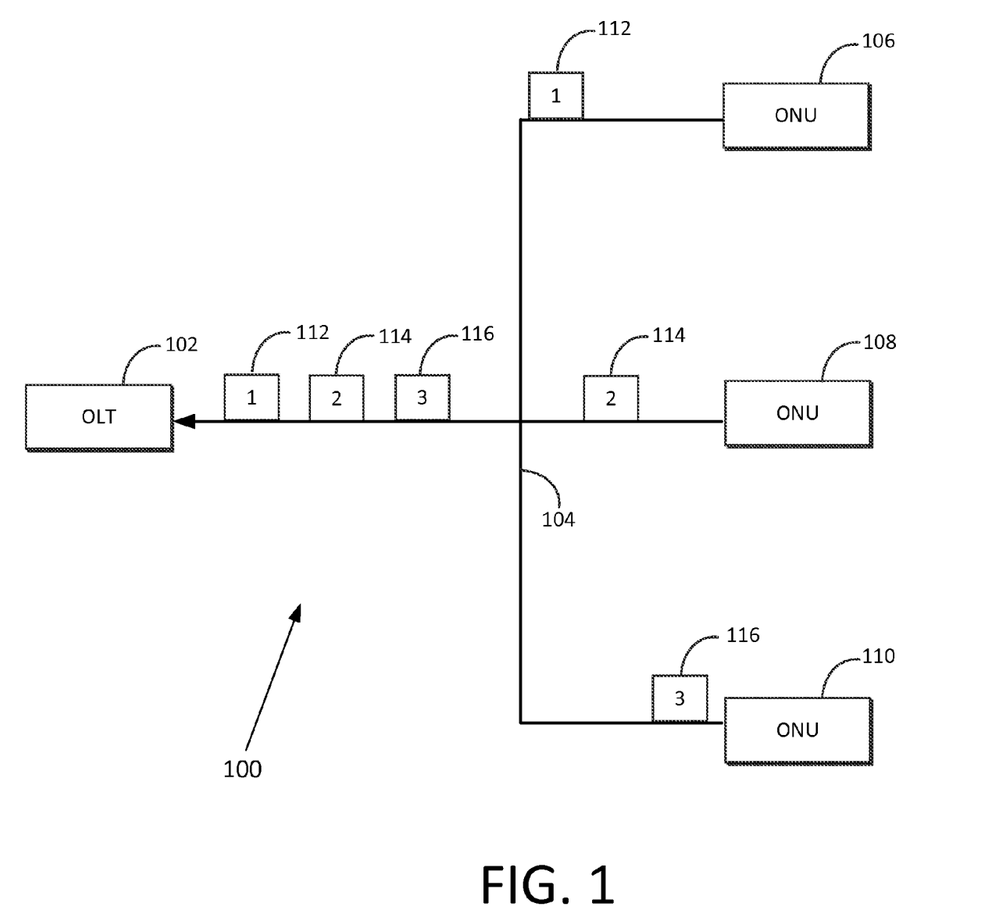
FIG. 1 is a simplified network diagram of an example optical network.

FIG. 1 is a simplified diagram of an example optical network 100 depicting how communication takes place in certain types of optical networks, according to an embodiment. The optical network 100, includes an Optical Line Terminal (OLT) 102. The OLT 102 functions as an endpoint for the optical network 100, and is generally located at a facility of a data service provider (such as a cable television company). The OLT 102 is linked to a number of Optical Network Units (ONUs) via fiber optic lines 104. The ONUs are represented in FIG. 1 by a first ONU 106, a second ONU 108, and a third ONU 110. Each ONU is located at a respective customer premises and functions as an interface to which a customer (with the appropriate equipment and subscription) can attach a computer, television, or other similar device for the purpose of obtaining one or more data services (e.g., high-speed internet), according to various embodiments. The example optical network 100 is depicted as having a tree topology, but other suitable topologies are utilized in other embodiments.

When transmitting data bursts upstream, each ONU transmits during a different timeslot from timeslots corresponding to the other ONUs. For example, the first ONU 106 transmits a data burst 112 during a first timeslot, the second ONU 108 transmits a data burst 114 during a second timeslot, and the third ONU transmits a data burst 116 during a third timeslot. The different timeslots corresponding to the different ONUs are represented by the relative left-right positioning of the data bursts 112, 114, 116 in FIG. 1. Thus, according to some embodiments, the communication scheme that the optical network 100 uses for the data bursts 112, 114, 116 could be considered a one-dimensional system, with the single dimension being time. In an embodiment, the optical network 100 is an EPON network.

Figure 2:
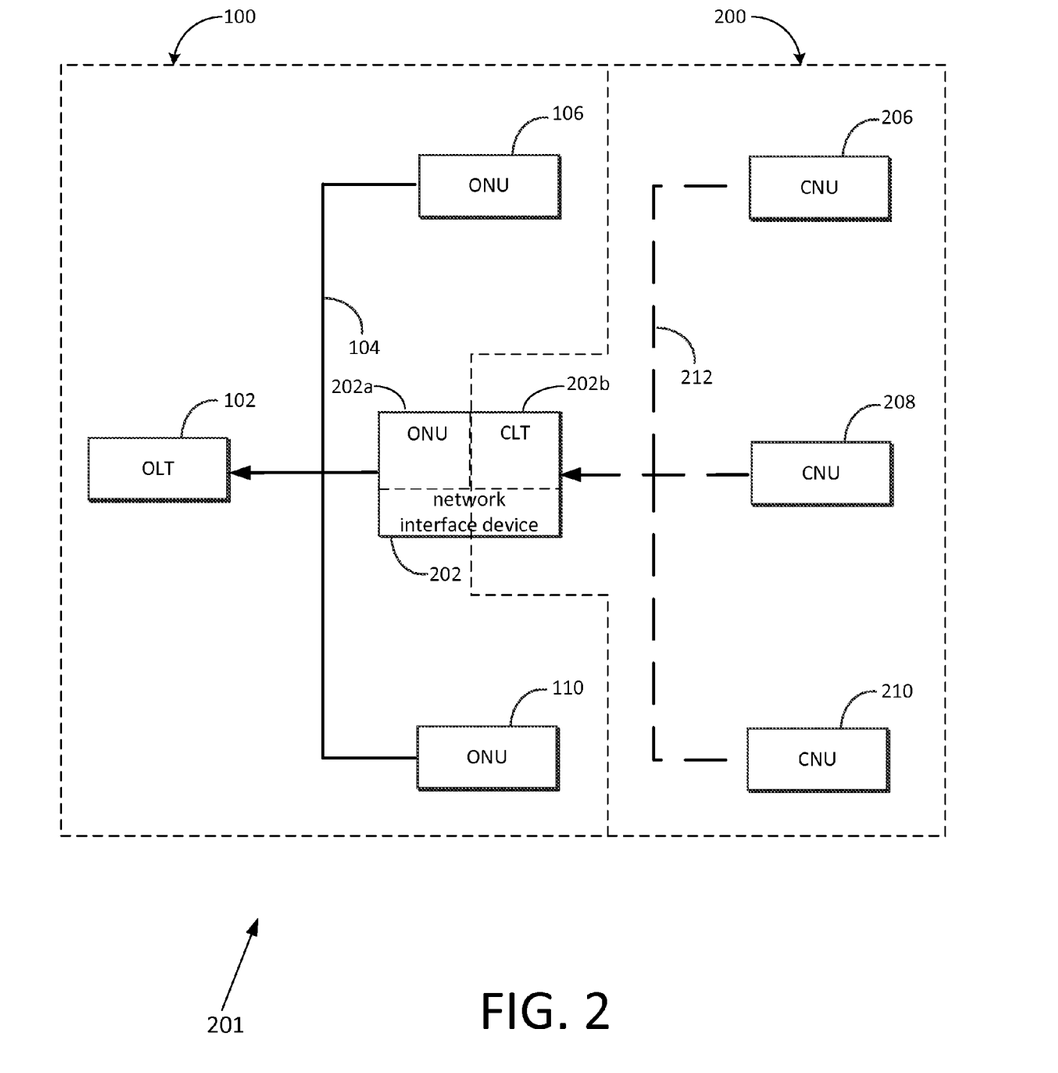
FIG. 2 is a simplified network diagram of an example in which an optical network is interfaced with a coax network, according to an embodiment.

FIG. 2 is a simplified diagram of the network 100 of FIG. 1 interfaced with a coax network 200, according to an embodiment. In an embodiment, the combination of the optical network 100 and the coax network 200 constitutes an EPoC network 201. In this example, the functionality of the second ONU 108 from FIG. 1 is integrated into a network interface device 202 (described in more detail below). The ONU functionality is represented by an ONU portion 202a of the network interface device 202. Unlike the second ONU 108 of FIG. 1, however, the network interface device 202 is not located at a customer premises, but rather at a facility of the data service provider. The coax network 200 includes a Cable Line Terminal (CLT), whose functionality is integrated within a CLT portion 202b of the network interface device 202. The CLT portion 202b functions as an endpoint of the coax network 200, according to an embodiment. The coax network 200 also includes a number of Cable Network Units (CNUs). The CNUs are represented in FIG. 2 by a first CNU 206, a second CNU 208, and a third CNU 210. Each CNU is located at a respective customer dwelling and functions as an interface to which a customer (with the appropriate equipment and subscription) can attach a computer, television, or other similar device for the purpose of obtaining one or more data services (e.g., high-speed internet), according to various embodiments. The CNUs are connected to the CLT portion 202b via a coaxial cable medium or media 212. The example coax network 200 is depicted as having a tree topology, but other suitable topologies are utilized in other embodiments. Additionally, the number of ONUs and CNUs depicted in FIG. 2 is meant only to be representative, and other suitable numbers of ONUs and CNUs are utilized in other embodiments.

In an embodiment, the optical network 100 of FIG. 2 is an EPON, in which the OLT 102 functions as a central terminal. Through the optical network 100, the OLT 102 can deliver broadband data to each customer who is equipped with an ONU. Some ONUs are directly installed at each dwelling while others may be installed at a residential community, or near a multiple dwelling unit (e.g., an apartment complex), and the coax network 200 it utilized to extend access to individual customers. The node that achieves this latter function is the CLT portion 202b of the network interface device 202, according to an embodiment.

In an embodiment, the CNUs transmit data bursts upstream to the CLT portion 202b using radio-frequency (RF) signals over the coaxial cable medium or media 212, in which the data burst from each of the CNUs overlaps, at least partially, with one or more of the data bursts from the other CNUs, at least in some scenarios. In some embodiments, the data bursts from the CNUs are modulated and/or encoded such that data bursts that overlap in time can be recovered by the CLT portion 202b. For example, the first CNU 206 may transmit a first data burst at the same (or partially overlapping) time as a second data burst from the second CNU 208, but the first data burst is transmitted at a different frequency than the second data burst, the first data burst is encoded with a different spread code than the second data burst, etc. In an embodiment, the CNUs transmit data bursts to the CLT portion 202b of the network interface device 202 via RF signals formatted according to Orthogonal Frequency-Division Multiple Access (OFDMA) techniques. In some embodiments, the CNU transmissions are capable of being multiplexed in both time and frequency (or multiplexed in both time and using different spread codes, etc.), and thus the CNU transmissions are considered to utilize two-dimensional multiplexing.

Figure 3:
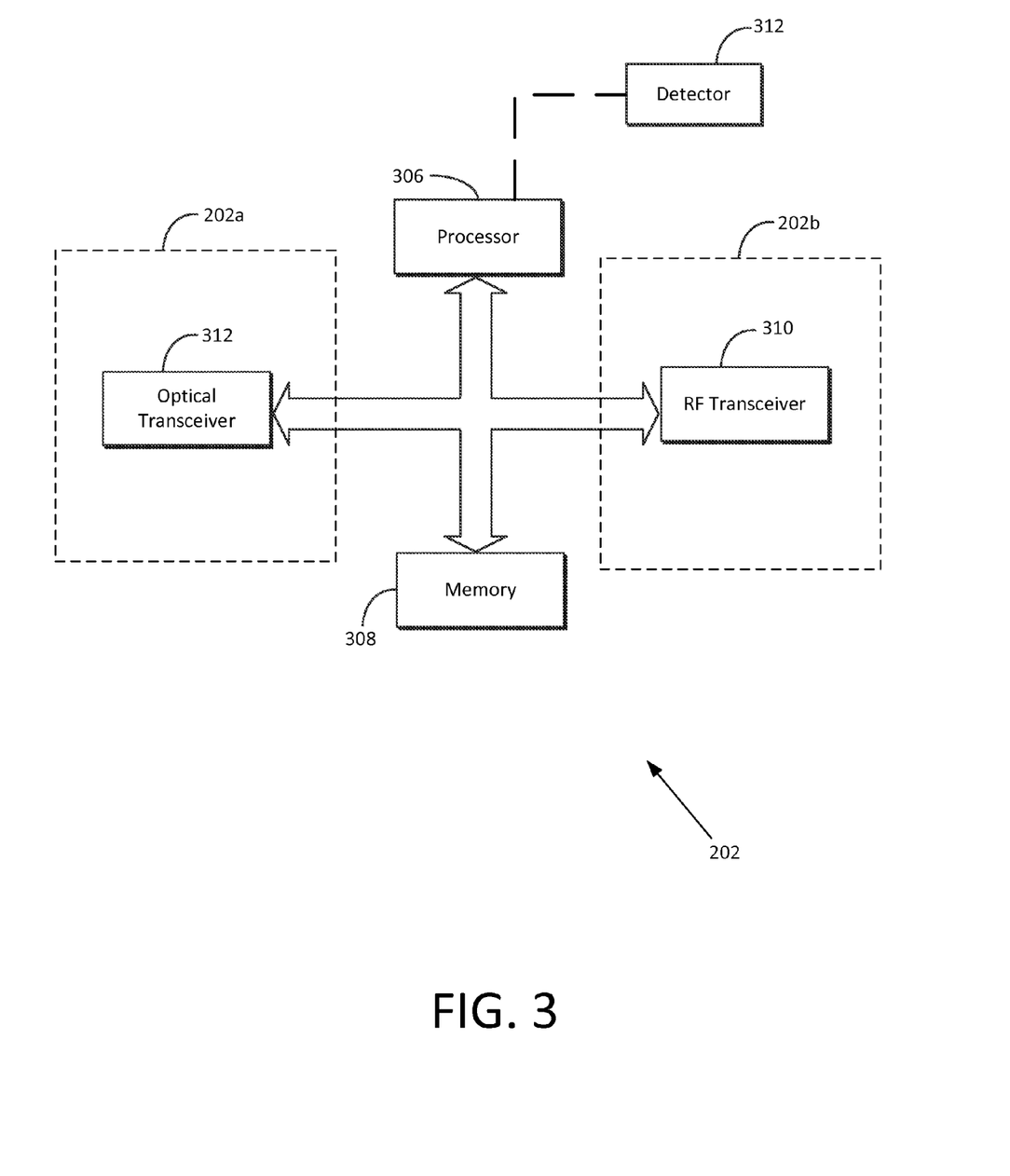
FIG. 3 is a simplified block diagram of an example network interface device configured to demarcate data, in an embodiment.

FIG. 3 is a simplified block diagram of an example structure of the network interface device 202 configured to demarcate data bursts, according to an embodiment. The network interface device 202 communicates with both the optical network 100 and the coax network 200. The division between the ONU portion 202a and the CLT portion 202b is physical and/or logical. Thus, in some embodiments, the two portions 202a and 202b share one or more components. The network interface device 202 includes a hardware processor 306 ("processor 306") (e.g., a microprocessor, controller, an application-specific integrated circuit (ASIC), a programmable logic device (PLD), etc.), a memory 308 (e.g., volatile or non-volatile memory), an RF transceiver 310, and an optical transceiver 312. In some embodiments, the processor 306 retrieves instructions from the memory 308 and executes those instructions to carry out the various methods disclosed herein. In other embodiments, the processor 306 is a circuit device that does not execute instructions stored in a memory, and thus the memory 308 can be omitted. The network interface device 202 also includes a detector 312, which is depicted in FIG. 3 as software executed by the processor 306. In other embodiments, the detector 312 is a separate hardware device, such as a separate microprocessor executing instructions store in a memory (e.g., the memory 308 or a separate memory), a separate circuit device that does not execute instructions store in a memory, etc.

Continuing with FIG. 3, the coaxial transceiver 310 receives RF signals from the coaxial network 200, converts those signals into digital information, and provides the digital information to the processor 306. The coaxial transceiver 310 also receives digital information from the processor 306, converts the digital information into RF signals, and transmits the signals via the coax network 200. The optical transceiver 312 receives digital information from the processor 306, converts the digital information into optical signals, and transmits the optical signals via the optical network 100. The optical transceiver 312 also receives optical signals from the optical network 100, converts the optical signals into digital information, and provides the digital information to the processor 306.

Figure 4:
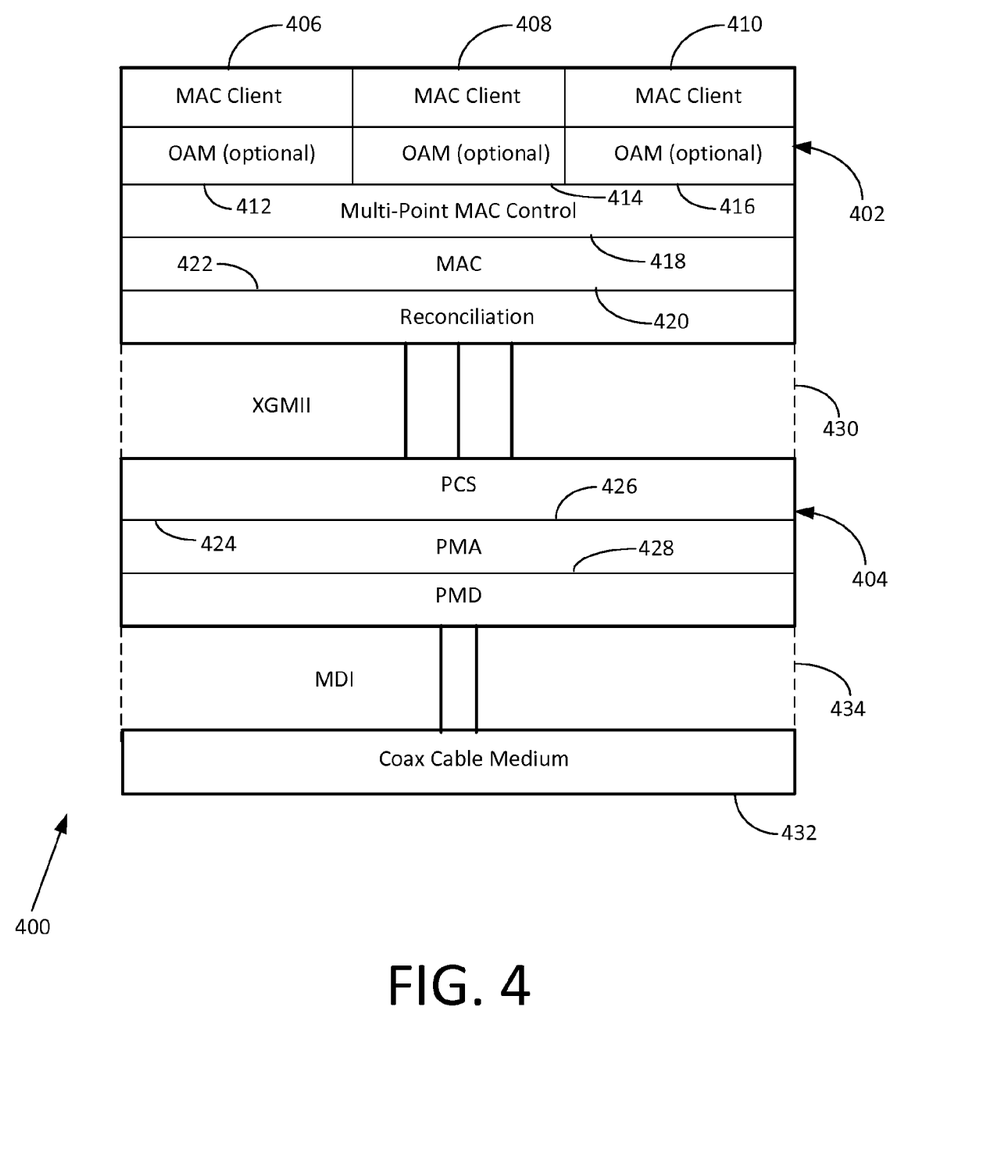
FIG. 4 is a block diagram of an example of logical layers used by a network interface device configured to demarcate data bursts, in an embodiment.

Turning to FIG. 4, logical protocol layers used by the network interface device 202 in an embodiment are shown. The logical protocol layers in this embodiment are part of an Ethernet layer structure 400, which includes a logical link control (LLC) layer 402 and a physical layer (PHY) 404. The LLC layer 402 includes one or more Media Access Control sublayer (MAC) client mechanisms represented by a first MAC client 406, a second MAC client 408, and a third MAC client 410. Each MAC client mechanism corresponds to a respective CNU, according to an embodiment. In some embodiments, the LLC 402 also includes multiple operations, administration and management (OAM) sublayers, represented by a first OAM 412, a second OAM 414, and a third OAM 416. Each OAM mechanism corresponds to a respective CNU, according to an embodiment. The LLC layer 402 further includes a multi-point MAC control 418, a MAC sub-layer 420. In an embodiment, the multi-point MAC control 418 arbitrates between the ONUs to grant upstream transmission opportunities to the ONUs.

The physical layer 404 includes a reconciliation sub-layer 422, a Physical Coding Sub-layer (PCS) 424, a Physical Medium Attachment (PMA) sub-layer 426, and a Physical Medium Dependent (PMD) sub-layer 428.

In an embodiment, the LLC layer 402 and the reconciliation sub-layer 422 are implemented by a MAC processing device (e.g., a microprocessor, a controller, an ASIC, a PLD, etc.), and the PCS 424, the PMA sub-layer 426, and the PMD sub-layer 428 are implemented by a PHY processing device (e.g., a microprocessor, a controller, an ASIC, a PLD, etc.), The MAC processing device interfaces with the PHY processing device via a ten Gigabit Media Independent Interface (XGMII) 430, in an embodiment. The PHY processing device interfaces with a coax cable 432 via a Medium Dependent Interface (MDI) 434.

According to an embodiment, the optical network 100 is an EPON, and the EPoC network 201 is expected to use the same MAC and above layers as the optical network 100, but replaces an optical transceiver with Orthogonal Frequency-Division Multiplexing (OFDM) technology over coax cable. The EPON defines a MAC layer protocol and a Multi-Point MAC Control mechanism to achieve a time-division multiplexing access (TDMA) through optical fiber. The EPoC network 201 redefines the PCS sub-layer 424, the PMA sub-layer 426, and the PMD sub-layer 428 to operate an OFDM-based physical layer through the coax cable medium 432.

In an embodiment, the MAC layer 420 maintains the time-division burst transmission, but the physical layer 404 uses OFDMA to access the coax cable 432. Therefore, the network interface device 202 serves to map two-dimensional data bursts from the coax network 200 to a one-dimensional data burst, as will be described in further detail below.

In an embodiment, the network interface device 202 receives two-dimensional data bursts from the CNUs of the coax network 200, converts the data bursts into one-dimensional (time-multiplexed) data bursts, and transmits the one-dimensional data bursts via the optical network 100. For example, the network interface device 202 may receive OFDMA data bursts at the CLT portion 202b via the coax cable medium 212, convert (at the PMA sub-layer 426) those OFDMA data bursts into a format that is compatible with that of the optical network 100, provide the converted data bursts to the ONU portion 202a via the XGMII interface 430 to the LLC layer 402, and transmit the data bursts via optical signaling using the optical transceiver 312 to the optical network 100.

According to an embodiment, each data burst received by the network interface device 202 from the CNUs has a the two-dimensional structure in which each burst a width, in the time dimension, of K upstream OFDM symbols, where K is a parameter that may be set by the system operator, e.g., to a suitable positive integer. In the frequency dimension, the start of each burst is indicated by a start marker, and the end of each burst is indicated by an end marker. If an entire burst cannot be fit within a set of K OFDM symbols, then the burst continues into a following set of K OFDM symbols. In one embodiment, the start and end markers made up of symbols drawn from {+1, −1}. In other embodiments, the start and end markers are made up of symbols drawn from other suitable sets of symbols.

Figure 5:
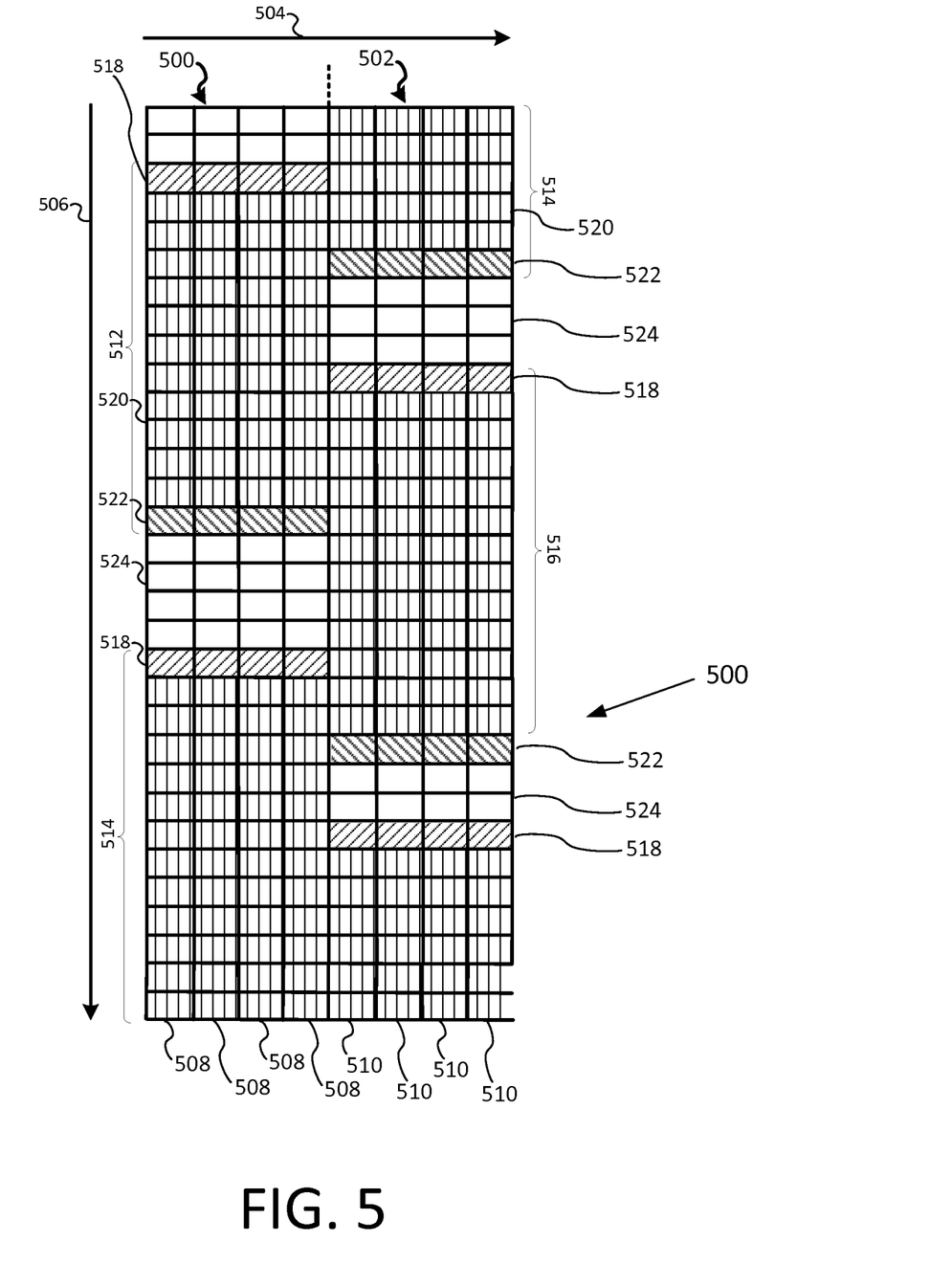
FIG. 5 is a diagram showing an example format of a data burst in the time and frequency domains, according to an embodiment.

Turning to FIG. 5, an example format of a data burst that one or more of the CNUs of FIG. 2 sends to the network interface device 202, according to an embodiment, is shown. Each data burst starts with a start marker and stops with the end marker. In the example of FIG. 5, the parameter K is set to 4 (four), and two sets of K OFDM symbols are shown—a first set 500 and a second set 502. The first set 500 and the second set 502 of OFDM symbols are defined in both the time dimension (indicated by a time axis 504) and the frequency dimension (indicated by a frequency axis 506). Each OFDM symbol spans multiple subcarriers—32 subcarriers in this example. The first set 500 includes four OFDM symbols 508 and the second set 502 includes four OFDM symbols 510. Each of the smallest blocks illustrated in FIG. 5 is a resource element, which is one symbol in width in the time dimension and one subcarrier in height in the frequency dimension. A consecutive set of K resource elements (four in this example) is referred to herein as a resource block. The first set 500 of OFDM symbols includes a first data burst 512. A second data burst 514 spans the first set 500 and the second set 502 of OFDM symbols. The second set 502 of OFDM symbols includes a third data burst 516. Each data burst shown in FIG. 5 includes a start marker 518 (indicated by blocks filled with diagonal lines sloping up from left-to-right), an end marker 522 (indicated by blocks filled with diagonal lines sloping down from left-to-right), and data elements 520 (indicated by blocks filled with vertical lines) between the start marker 518 and the end marker 522. In FIG. 5, the data elements (payload) 520 are shown as being in a range of frequencies immediately contiguous with the start marker 518 and end marker 522, but other configurations are possible.

Between each burst are a minimum number ($N_{min}$) of resource blocks of zero subcarriers in the frequency dimension, represented by a gap 524 (indicated by white blocks). The particular value of $N_{min}$ may be determined by the required error probability of miss detection and false detection. Note that the number of blocks of zero subcarriers can be more than $N_{min}$, depending on the gaps between two bursts.

As discussed above, in one embodiment, the start and end markers are made up of symbols drawn from $\{+1, -1\}$. In an embodiment, the sender of the data burst (e.g., a CNU) forms the sequence of the start/end markers such that the number of +1 values and number of −1 values is equal. Furthermore, in an embodiment, the end marker is orthogonal to the start marker. For example, when K=8, the start marker can be $\{1\ -1\ -1\ 1\ -1\ 1\ -1\ 1\}$ while the end marker is $\{-1\ 1\ 1\ -1\ 1\ -1\ 1\ -1\}$. In other embodiments, the start and end markers are made up of symbols drawn from other suitable sets of symbols.

Figure 6:
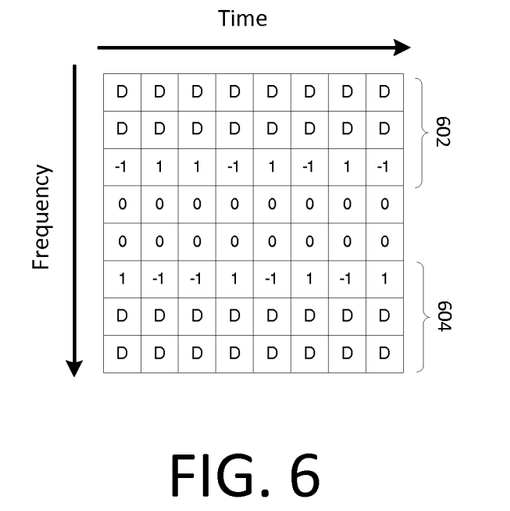
FIG. 6, FIG. 7, and FIG. 8 are diagrams showing example formats of a data burst in the time and frequency domains, according to several embodiments.

Turning to FIG. 6, an example of a start marker and an end marker, according to an embodiment in which K=8, is shown. The end marker (represented by the 1 and −1 blocks) of a first data burst 602 immediately follows (in terms of frequency) the data elements (labeled 'D') of the first data burst 602. The start marker of a second data burst 604 (represented by the 1 and −1 blocks) immediately precedes (in terms of frequency) the data elements (again, labeled 'D') of the second data burst 604 (only part of which is shown). Between the end marker 602 and the start marker 604 are zero subcarriers (labeled '0'). In the example of FIG. 6, $N_{min}$=2.

Figure 7:
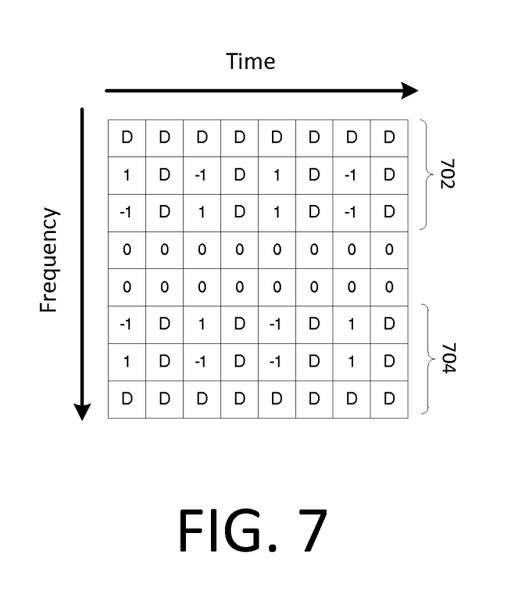

Turning to FIG. 7, another example of a start marker and an end marker, according to an embodiment in which K=8, is shown. In this example, an end marker of a first data burst 702 (represented by the 1 and −1 blocks) and a start marker of a second data burst 704 (represented by the 1 and −1 blocks) are each split into two orthogonal sequences and placed on two adjacent subcarrier blocks. Note that the data elements D are interspersed among the elements of the start marker and the elements of the end marker.

Figure 8:
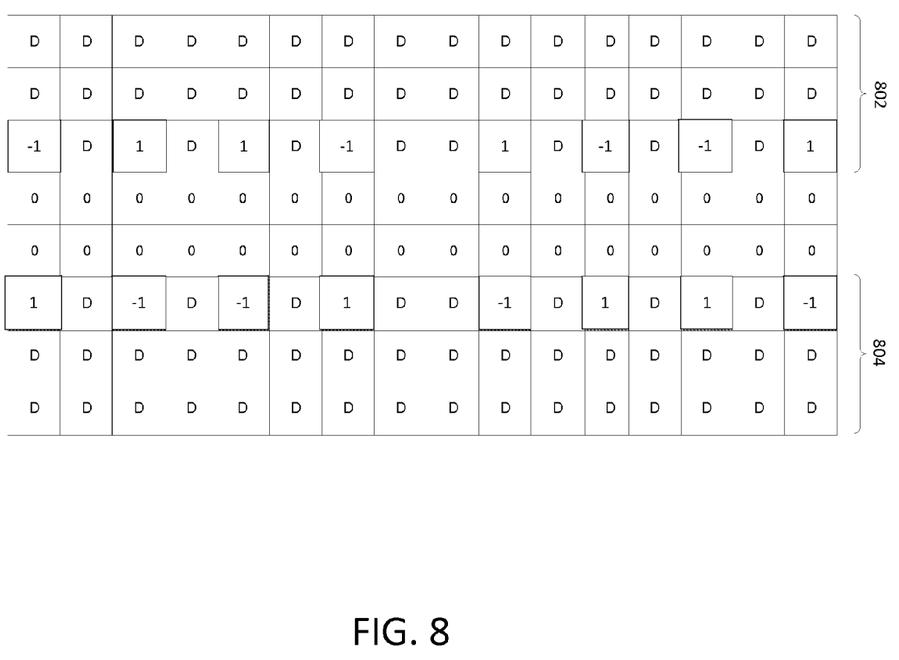

Marker sequences similar to those described above with respect to FIG. 5, FIG. 6, and FIG. 7 can also be applied to bursts of less than 8 OFDM symbols or more than 8 OFDM symbols. FIG. 8, for example, shows a burst marker of 16 OFDM symbols, according to an embodiment in which K=16. As can be seen, the start marker elements (blocks containing −1s and 1s) of a first data burst 802 and of the end marker (blocks containing −1s and 1s) of a second data burst 804 alternates with data elements D.

Figure 9:
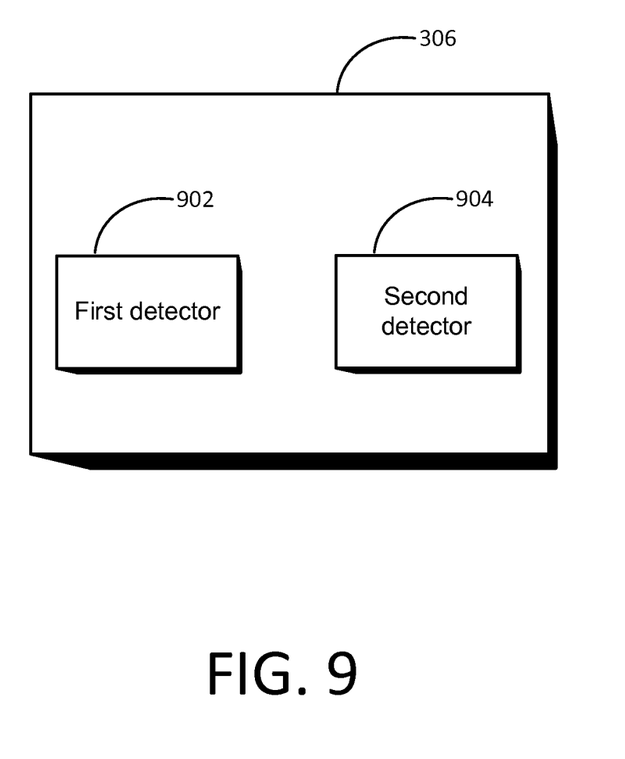
FIG. 9 is a block diagram showing an example two-detector implementation, according to an embodiment.

Turning to FIG. 9, in an embodiment, the detector 312 of FIG. 3 is implemented as two separate detectors—a first detector 902 and a second detector 904. The two detectors work together to reliably detect burst markers, in an embodiment. The network interface device 202, in this embodiment, also uses the first detector 902 to detect the blocks of zero subcarriers. In an embodiment, when the network interface device 202 receives a data burst from a CNU, the first detector 902 calculates the sum P of the power over the resource elements (i.e., $N_{min}$ resource blocks and K resource elements per resource block) and compares P with a suitable threshold $T_1$ as follows:

$$P = \sum_{i=1}^{N_{min}} \sum_{j=1}^{K} p_{ij} < T_1 \begin{cases} \text{True, Detected} \\ \text{False, Undetected} \end{cases} \quad \text{Equation 1}$$

where $p_{ij}$ is the power in a given resource element, and i and j are indices. If the calculated power P is not less than the threshold $T_1$, then the first detector 902 determines that a zero subcarrier has not been detected and remains in its initial state. If the calculated power P is less than the threshold $T_1$, then the first detector 902 determines that a zero subcarrier has been detected and passes the detection process to the second detector 904.

In an embodiment, the second detector 904 includes a correlator that can be used to detect a particular burst marker sequence. In an embodiment, the second detector 904 calculates a cross-correlation C, which is the cross correlation of a received value $r_i$ and an actual value $b_i$, compares the calculated cross-correlation C with a threshold $T_2$ and evaluates whether a start marker or end marker has been detected as follows:

$$C = \left| \sum_{i=0}^{M} r_i b_i \right| \geq T_2 \begin{cases} \text{True, Detected} \\ \text{False, Undetected} \end{cases} \quad \text{Equation 2}$$

If the calculated cross-correlation C is greater than or equal to the threshold $T_2$, then the second detector 904 considers that start marker or end marker has been detected. Otherwise, the second detector 904 considers that a start marker or end marker has not been detected. The parameter M is a length of the burst marker. The thresholds $T_1$ and $T_2$ may be designed to meet the required error probability of miss detection and false detection, according to various embodiments and/or scenarios.

Figure 10:
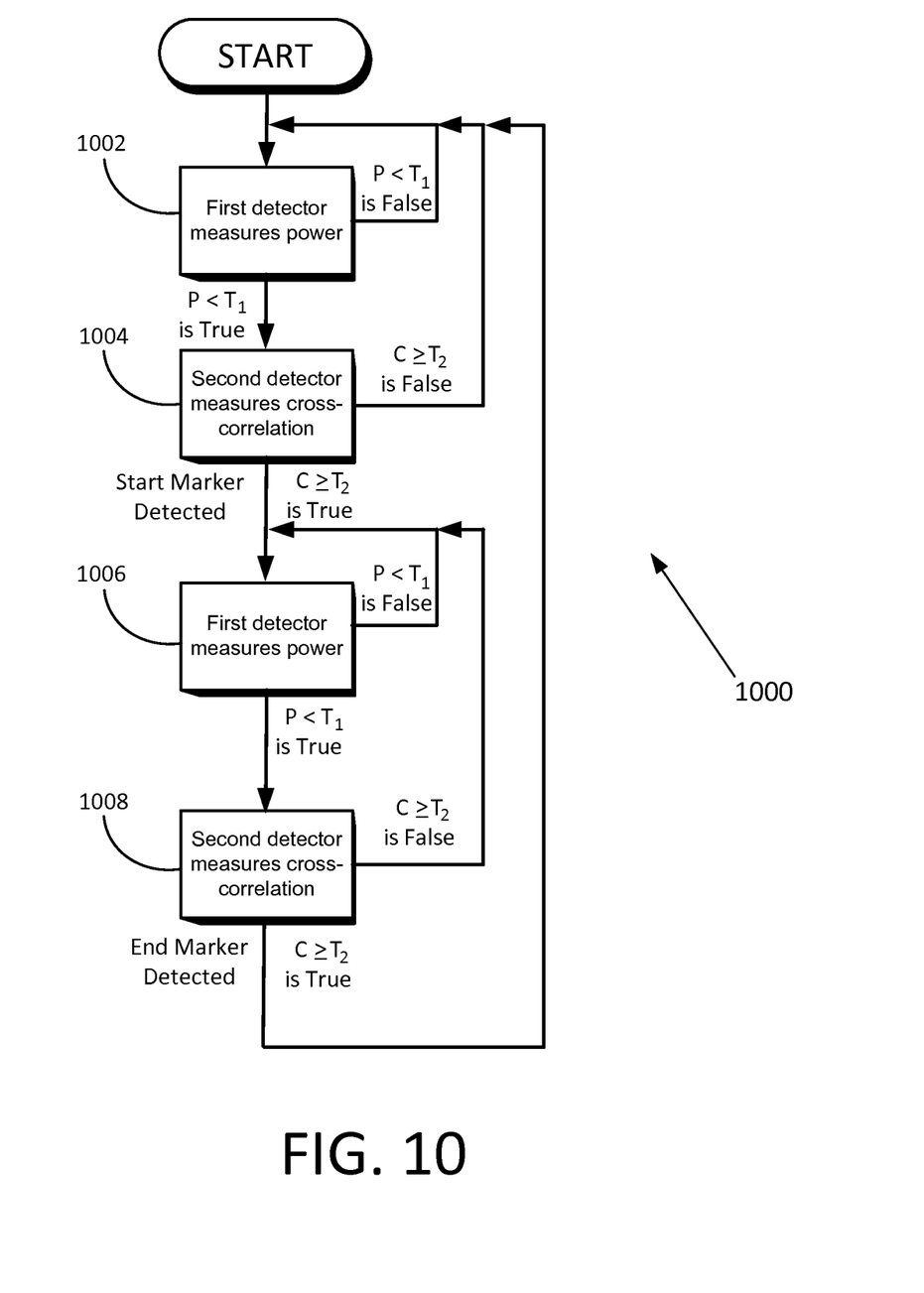
FIG. 10 is a flow diagram depicting an example operation of the two-detector implementation of FIG. 9 in an embodiment.

Turning to FIG. 10, a flow diagram 1000 illustrates an example method for the first detector 902 and the second detector 904 to detect start markers and end markers, according to an embodiment. It will be assume that a series of OFDM symbols comes into the network interface device 202 and is received by the first detector 902. At block 1002, the first detector 902 receives the symbols and calculates P (e.g., using Equation 1). If P is not less than $T_1$, then the process stays at block 1002. If P is less than $T_1$, then a determination is made that a zero subcarrier has been detected and the process moves to block 1004. At block 1004, the second detector 904 measures the cross-correlation C (e.g., using Equation 2). If C is not greater than or equal to $T_2$, then a determination is made that a start marker has not been detected and the process moves back to block 1002. If C is greater than or equal to $T_2$, then a determination is made that a start marker has been detected, and the process moves to block 1006.

At block 1006, the first detector 902 calculates P. If P is not less than $T_1$, then the process stays at block 1006. If P is less than $T_1$, then a determination is made that a zero subcarrier has been detected and the process moves to 1008. At block 1008, the second detector 904 measures the cross-correlation C. If C is not greater than or equal to $T_2$, then the process moves back to block 1006. If C is greater than or equal to $T_2$, then a determination is made that an end marker has been detected, and the process moves back to block 1002.

Figure 11:
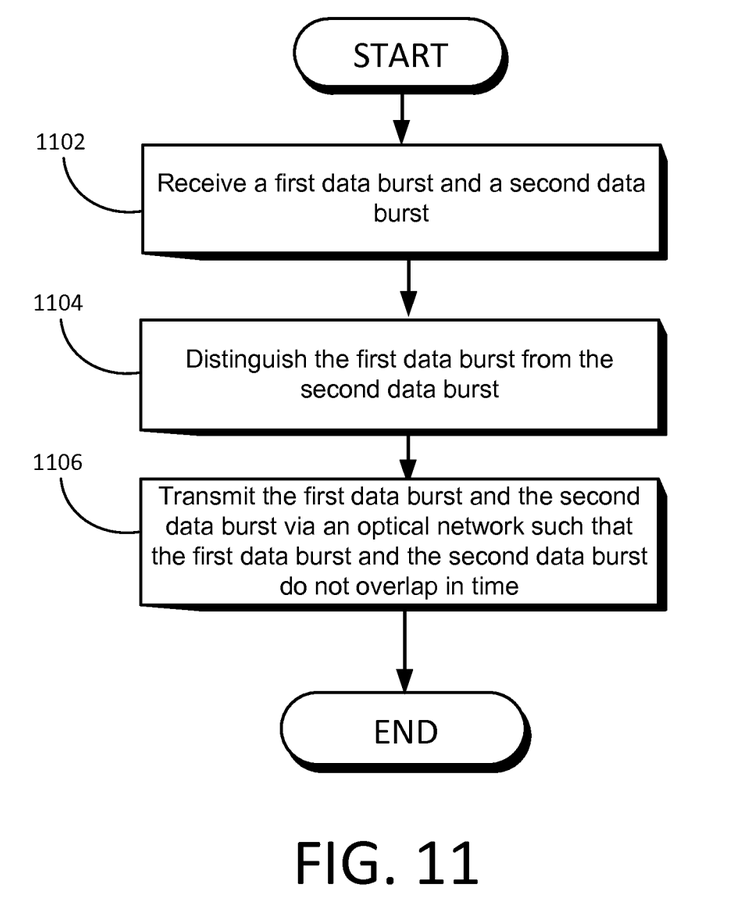
FIG. 11 is a flow diagram depicting an example method for demarcating data bursts according to an embodiment.

FIG. 11 is a flow diagram of an example method 1100 for demarcating data bursts, according to an embodiment. The method 1100 is implemented by the processor 306, the detector 312, and/or the network interface device 202, according to various embodiments. In other embodiments, the method 1100 is implemented by another suitable communication device. Similarly, in some embodiments, the processor 306, the detector 312 and/or the network interface device 202 implement other suitable methods for demarcating data bursts.

At block 1102, a communication device, such as the network interface device 202, receives a first data burst and a second data burst. In an embodiment, the first data burst and the second data burst at least partially overlap in the time domain; the first data burst comprises a first start marker, data elements following the first start marker, and a first end marker following the data elements. In an embodiment, the first start marker is orthogonal to the first end marker. In an embodiment, the second data burst comprises a second start marker, data elements following the second start marker, and a second end marker following the data elements of the second data burst. In some embodiments, the start/end markers comprise symbols that are interspersed with additional data elements.

At block 1104, the communication device distinguishes the first data burst from the second data burst based on the first start marker and the first end marker. In some embodiments, the device distinguishes the first data burst from the second data burst further based on the second start marker and, optionally, the second end marker.

At block 1106, the communication device transmits the first data burst and the second data burst via an optical network such that the first data burst and the second data burst do not overlap in time.

At least some of the various blocks, operations, and techniques described above may be implemented utilizing hardware, a processor executing firmware instructions, a processor executing software instructions, or any combination thereof. When implemented with one or more processors executing firmware and/or software instructions, the instructions are stored in one or more memory devices coupled to the one or more processors.

When implemented in hardware, the hardware may comprise one or more of discrete components, an integrated circuit, an ASIC, a PLD, etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for demarcating data bursts, the method comprising
    receiving, via a coax network, a first data burst and a second data burst at a network interface device, wherein
        the first data burst and the second data burst at least partially overlap in the time domain,
        the first data burst comprises a start marker, first data elements following the start marker, and an end marker following the first data elements,
        the start marker is orthogonal to the end marker, and
        an end of the first data burst is separated from a start of the second data burst by a block of zero sub-carriers;
    detecting, at the network interface device, the block of zero sub-carriers;
    distinguishing, at the network interface device, the first data burst from the second data burst based on the start marker, the end marker, and detecting the block of zero sub-carriers; and
    transmitting the first data burst and the second data burst via an optical network such that the first data burst and the second data burst do not overlap in time.

2. The method of claim 1, wherein receiving the first data burst and the second data burst comprises receiving the first data burst and the second data burst in the form of orthogonal-frequency multiple access (OFDMA) symbols.

3. The method of claim 1, wherein:
    receiving the first data burst and the second data burst comprises receiving the first data burst and the second data burst via an orthogonal frequency-division multiplexing (OFDM) scheme; and
    transmitting the first data burst and the second data burst comprises transmitting the first data burst and the second data burst in a time-multiplexed manner via an Ethernet passive optical network.

4. The method of claim 1, further comprising converting, at a communication device that includes or is coupled to the network interface device, the first data burst and the second data burst from a format that is compatible with a network that utilizes orthogonal frequency-division multiple access (OFDMA) to a format that is compatible with a passive optical network that utilizes time multiplexing.

5. The method of claim 1, further comprising:
    converting, at a communication device that includes or is coupled to the network interface device, the first data burst and the second data burst from a format that is compatible with a coax network to a format that is compatible with a passive optical network; and
    providing the converted data bursts to the passive optical network via a ten gigabit media independent interface.

6. The method of claim 1, wherein:
    receiving the first data burst and the second data burst comprises receiving the first data burst and the second data burst multiplexed in two-dimensions; and
    transmitting the first data burst and the second data burst comprises transmitting the first data burst and the second data burst multiplexed in one-dimension.

7. The method of claim 1, wherein the start marker and the end marker comprise symbols drawn from a set comprising +1 and −1.

8. The method of claim 7, wherein, for each of the start marker and the end marker, a number of +1 symbols is equal to a number of −1 symbols.

9. The method of claim 1, wherein receiving the first data burst and the second data burst comprises:
    receiving the data elements of the first data burst across a first range of subcarriers; and
    receiving the second data burst across a second range of subcarriers.

10. The method of claim 1, wherein:
    the data elements of the first data burst are disposed immediately contiguous with the first start marker and the first end marker.

11. The method of claim 1, wherein receiving the first data burst and the second data burst comprises:
receiving an end of the first data burst separated by one or more zero sub-carriers from a start of the second data burst.

12. A network interface device for demarcating data bursts, the network interface device comprising:
a cable line terminal portion configured to receive a first data burst and a second data burst via a coax network; and
an optical network unit portion;
wherein the cable line terminal portion comprises one or more integrated circuit devices configured to
receive, via a coax network, a first data burst and a second data burst, wherein
the first data burst and the second data burst at least partially overlap in the time domain,
the first data burst comprises a start marker, data elements following the start marker, and an end marker following the data elements,
the start marker is orthogonal to the end marker, and
an end of the first data burst is separated from a start of the second data burst by a block of zero sub-carriers,
detect the block of zero sub-carriers, and
distinguish the first data burst from the second data burst based on the start marker, the end marker, and detecting the block of zero sub-carriers; and
wherein the optical network unit portion comprises one or more integrated circuit devices configured to transmit the first data burst and the second data burst via an optical network such that the first data burst and the second data burst do not overlap in time.

13. The network interface device of claim 12, wherein the one or more integrated circuit devices of the cable line terminal portion are configured to receive the first data burst and the second data burst according to an orthogonal-frequency multiple access scheme.

14. The network interface device of claim 12, wherein:
the one or more integrated circuit devices of the cable line terminal portion are configured to receive the first data burst and the second data burst according to an orthogonal frequency-division multiplexing scheme; and
the one or more integrated circuit devices of the optical network unit portion are configured to transmit the first data burst and the second data burst in a time-multiplexed manner over an Ethernet passive optical network.

15. The network interface device of claim 12, wherein the network interface device is configured to convert the first data burst and the second data burst from a format that is compatible with orthogonal frequency-division multiple access to a format that is compatible with a passive optical network that utilizes time multiplexing.

16. The network interface device of claim 12, wherein the network interface device is configured to:
convert the first data burst and the second data burst from a format that is compatible with coax network to a format that is compatible with a passive optical network; and
provide the converted data bursts to the passive optical network via a ten gigabit media independent interface.

17. The network interface device of claim 12, wherein:
the one or more integrated circuit devices of the cable line terminal portion are configured to receive the first data burst and the second data burst as according to a two-dimensional multiplexing scheme; and
the one or more integrated circuit devices of the optical network unit portion are configured to transmit the first data burst and the second data burst according to a one-dimensional multiplexing scheme.

18. The network interface device of claim 12, wherein the start marker and the end marker comprise symbols drawn from a set comprising +1 and −1.

19. The network interface device of claim 12, wherein:
the cable line terminal portion comprises a detector configured to distinguish the first data burst from the second data burst based on the start marker, the end marker, and detecting the block of zero sub-carriers.

20. The network interface device of claim 19, wherein the detector comprises:
a first detector configured to:
calculate a sum of power of a plurality of blocks of the first data burst;
compare the calculated sum with a first threshold; and
detect whether the plurality of blocks include a zero subcarrier bloc based on the comparison of the calculated sum; and
a second detector configured to:
cross correlate at least a portion of the first data burst with at least another portion of the first data burst;
compare the cross correlation with a second threshold; and
detect whether a portion of the first data burst constitutes a start marker or an end marker based on the comparison of the cross correlation.

21. A method for demarcating data bursts, the method comprising
receiving, via a coax network, a first data burst and a second data burst at a network interface device, wherein
the first data burst and the second data burst at least partially overlap in the time domain,
the first data burst comprises a start marker, first data elements following the start marker, and an end marker following the first data elements, and
the start marker is orthogonal to the end marker;
calculating a sum of power of a plurality of blocks separating an end of the first data burst from a start of the second data burst;
comparing the calculated sum with a first threshold; and
detecting whether the plurality of blocks include a zero subcarrier bloc based on the comparison of the calculated sum;
cross correlating at least a portion of the first data burst with at least another portion of the first data burst;
comparing the cross correlation with a second threshold; and
detecting whether a portion of the first data burst constitutes a start marker or an end marker based on the comparison of the cross correlation.

* * * * *